(No Model.) 3 Sheets—Sheet 1.
J. VERCELLI & B. GRAZIANA.
MACHINE FOR CUTTING, SHAVING, AND GRINDING CHEESE.
No. 412,810. Patented Oct. 15, 1889.
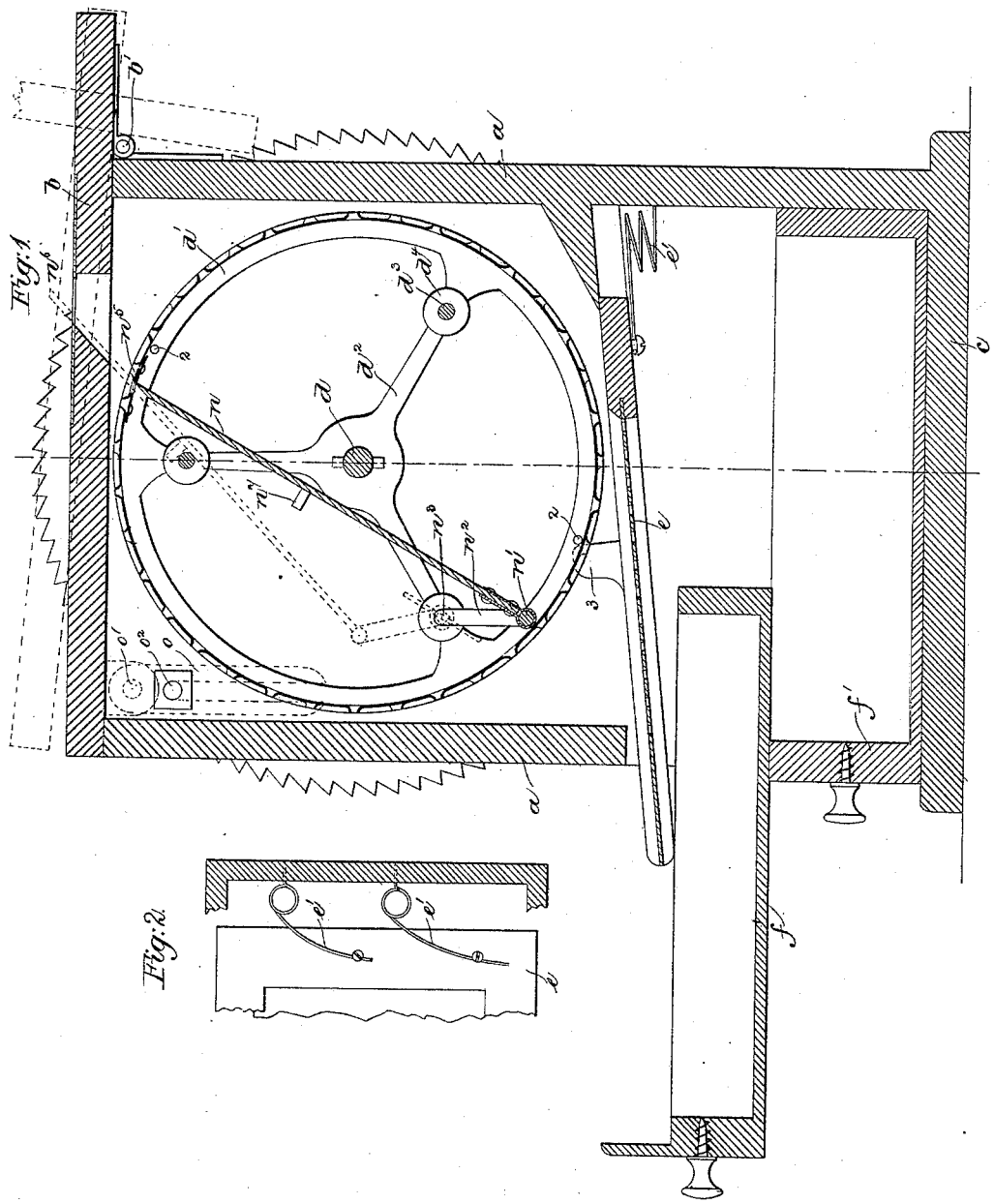
Witnesses:
Howard F. Eaton.
Frederick L. Emery.
Inventor:
Joseph Vercelli,
Battista Graziana.
by Crosby & Gregory Attys

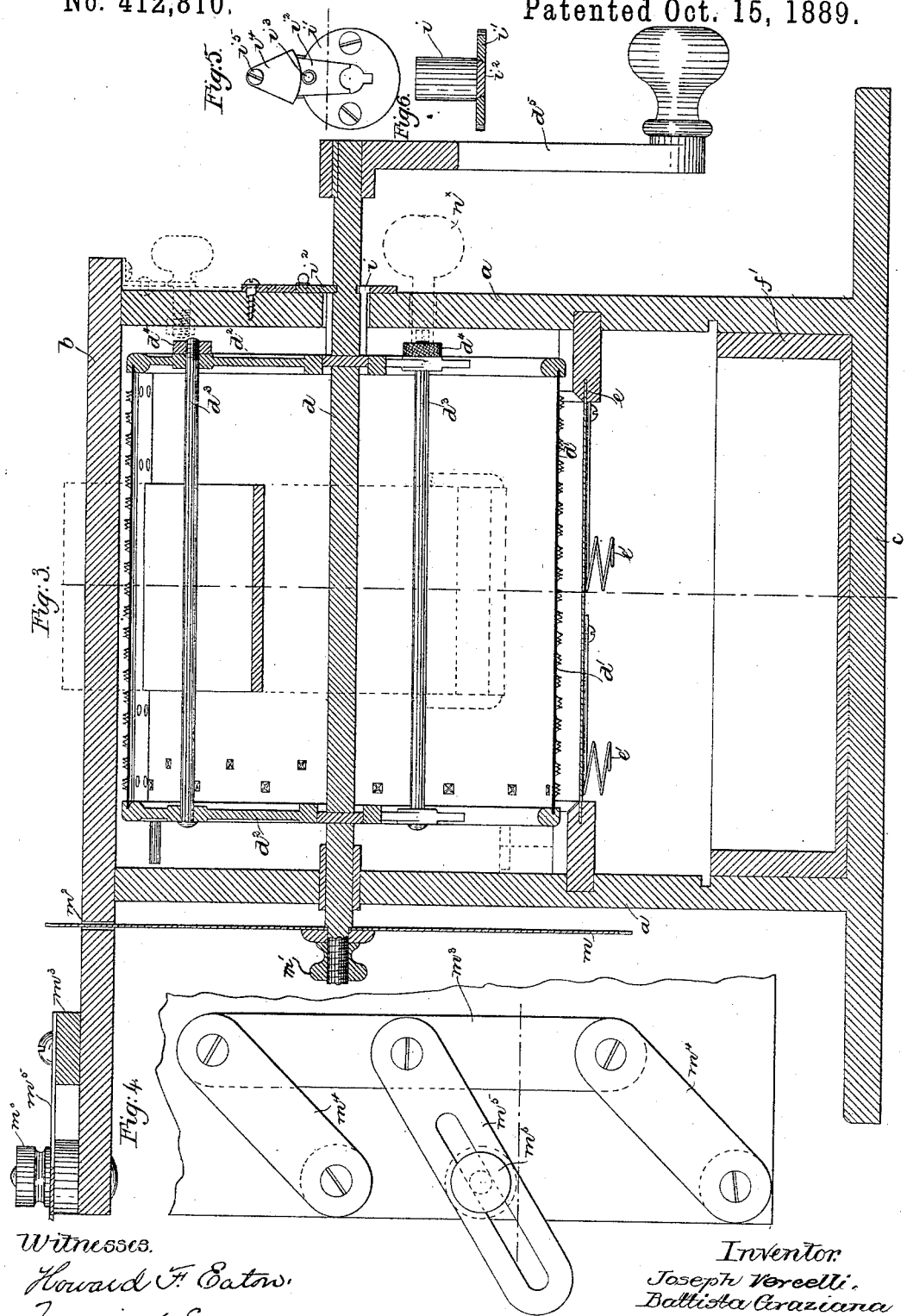

(No Model.) 3 Sheets—Sheet 3.

J. VERCELLI & B. GRAZIANA.
MACHINE FOR CUTTING, SHAVING, AND GRINDING CHEESE.

No. 412,810. Patented Oct. 15, 1889.

Witnesses.
Frederick L. Emery
Howard F. Eaton.

Inventor:
Joseph Vercelli,
Battista Graziana,
by Crosby & Gregory Attys.

UNITED STATES PATENT OFFICE.

JOSEPH VERCELLI AND BATTISTA GRAZIANA, OF BOSTON, MASSACHUSETTS.

MACHINE FOR CUTTING, SHAVING, AND GRINDING CHEESE.

SPECIFICATION forming part of Letters Patent No. 412,810, dated October 15, 1889.

Application filed May 23, 1889. Serial No. 312,449. (No model.)

*To all whom it may concern:*

Be it known that we, JOSEPH VERCELLI and BATTISTA GRAZIANA, both of Boston, county of Suffolk, State of Massachusetts, have invented an Improvement in Machines for Cutting, Shaving, and Grinding Cheese, of which the following description, in connection with the accompanying drawings, is a specification, like letters on the drawings representing like parts.

This invention has for its object to construct a machine for cutting, shaving, and grinding cheese and other material.

The invention consists in the combination, with a grater, as a grating-cylinder, of a plate, said plate being partially perforated, and two receptacles, one of which is arranged to receive the material falling from the top of the plate, and the other of which to receive the material passing through the perforations in the plate; also, in the combination, with the frame-work and top plate having an opening through it, of a knife adapted to be moved into the opening in the top plate, so that its cutting-edge occupies a position just above the top surface of the top plate, by which the cheese may be cut in thin slices or shaved off; also, in the combination, with the top plate, of a circular saw arranged on a shaft and appearing just above the surface of the top plate, by which the cheese may be sawed in blocks or pieces; also, in other details of construction, to be hereinafter described.

Figure 8:
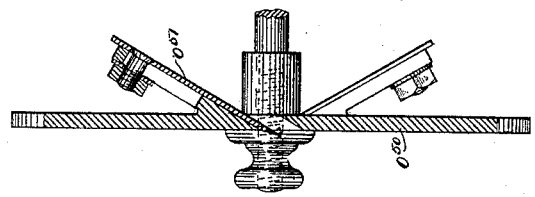
Figure 7:
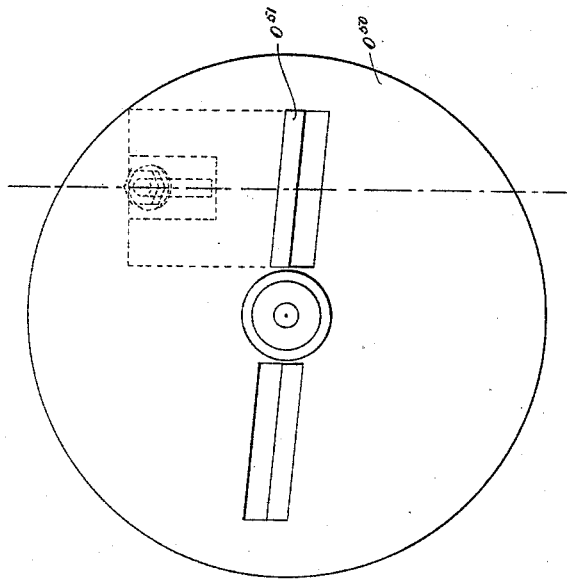

Figure 1 shows in vertical section a machine embodying this invention; Fig. 2, a detail to be referred to; Fig. 3, a vertical longitudinal section of the machine shown in Fig. 1; Fig. 4, a guide to be referred to; and Figs. 5, 6, 7, and 8, details to be referred to.

The main frame-work of the machine is shown as a box-like structure having side walls $a$, top plate $b$, and bottom plate $c$. A shaft $d$ passes through the box-like structure, having its bearings in the side walls $a$, said shaft having arranged on it a grating-cylinder $d'$. The grating-cylinder, as herein shown, consists of two end plates or frames $d^2$ and the cylinder proper, having the grating-surface, the said end plates $d^2$ being connected together by bolts $d^3$ and nuts $d^4$. A plate $e$ is arranged in suitable inclined guideways in the box-like structure below the grating-cylinder $d'$, said plate $e$ being perforated for a short distance only, and being agitated or moved back and forth to shake it as the cylinder revolves.

The means herein shown for agitating or moving the plate $e$ consists of a pin or pins 2, projecting from the cylinder, which strike an ear 3 on the plate or frame $e$, which ear rises into the path of movement of the pins. The pins operate to move the plate $e$ outwardly, and suitable springs $e$, (see Figs. 1 and 2) are provided, one of the ends of which are attached to the frame-work and the other ends attached to the plate $e$, which operate to withdraw or return the plate to its normal condition.

Two boxes, receptacles, or compartments or drawers $f\ f'$ are arranged beneath the plate $e$, and when in use one of the compartments, as $f$, is pulled out, as shown in Fig. 1, to expose the compartment or drawer $f'$ beneath it.

The top plate $b$ of the box-like structure is hinged at $b'$, that it may be raised to permit cheese, or it may be bread or any other suitable material, to be inserted or placed in the box beneath the cover on the grating-cylinder.

The shaft $d$ has secured to it a hand-crank $d^5$, by which it is revolved. As the shaft $d$ is revolved, the material being grated and falling on the inclined plate $e$, the finer particles pass through the perforations thereof and enter the compartment or drawer $f'$, while the coarser particles follow down the plate and enter the compartment $f$.

As a means of readily withdrawing the shaft $d$, that a coarser or finer grating-cylinder may be employed, I have provided the bearing $i$ for the shaft at one end with a flange $i'$, cut away or recessed at one side from the edge of the cylinder, in which recess a slide $i^2$ is dovetailed, said slide being withdrawn by means of the projection $i^3$ and being held in position by a segment $i^4$, pivoted at $i^5$, said segment resting on the upper edge of the slide $i^2$.

A circular saw $m$ is secured to the shaft $d$ by a set-screw $m'$, said saw being of suitable diameter to project through an opening $m^2$, formed in the plate $b$ of the box-like structure, and on said top plate a suitable adjustable guide is arranged parallel with the saw, (see Figs. 3 and 4,) said guide being herein shown as comprising the bar $m^3$, loosely connected to the parallel bars $m^4$, pivoted to the top plate, a slotted bar $m^5$, having a thumb-nut $m^6$, being employed for adjustment. By means of the saw and its guide, cheese or other suitable material may be sawed into blocks of any suitable size.

Inclosed in the grating-cylinder $d$ is a knife $n$, loosely connected at its lower end at $n'$ to a crank-arm $n^2$, fixed to a shaft $n^3$, provided with a squared end, as shown by dotted lines, Fig. 3, and which may be turned by applying thereto a key-pin $n^\times$, (see dotted lines, Fig. 3,) said key-pin having a correspondingly-shaped socket in its end to engage with the end of the shaft $n^3$. The cylinder has an opening $n^5$ through it, which, when in suitable position, registers with an opening $n^6$ in the pivoted top plate $b$. By turning the shaft $n^3$ the knife is forced out through the openings $n^5$ $n^6$ into the dotted-line position shown in Fig. 1, and when in such position the cutting-edge of the knife projects slightly above the top of the plate $b$, so that cheese or other suitable material may be moved over said top plate by hand, and pieces of any suitable thickness may be shaved off according to the adjustment of the knife. The knife $n$ has a pin $n^7$, which, when it is moved outwardly to be used, rests upon one of the bolts $d^3$, (see dotted lines, Fig. 1,) connecting the ends of the cylinder, to thereby serve as an abutment or shoulder, whereby considerable power may be resisted.

In lieu of the hand-crank $b^5$, the apparatus, as an organized machine, may be run by foot-power or by steam-power.

An adjusting device is provided for the pivoted top plate $b$, (herein shown as a slotted plate $o$,) loosely connected to the plate $b$ at $o'$, said slotted plate $o$ moving over a set-screw $o^2$, which may be employed to hold it in adjusted position.

In lieu of the saw $m$, mounted on the shaft $d$, a disk $o^{50}$ (see Figs. 7 and 8) may be mounted on said shaft, said disk bearing one or more knives, as $o^{51}$, held in suitable guides, the cutting-edges of said knives protruding through openings in the disk $o^{50}$. As the shaft is revolved, cheese or other material held in the hand or by any suitable holder may be sliced or shaved off by presenting the material to the face of the disk, the edges of the knives protruding slightly beyond the face of the disk, slicing or shaving the material as the disk is revolved.

We claim—

1. In a machine for cutting, slicing, and grating cheese, &c., the revolving grating-cylinder and circular saw, having their bearings in the frame-work of the box-like structure, the cylinder being within said structure, combined with a slicing-knife inclosed in the said cylinder, substantially as described.

2. The grating-cylinder $d'$, arranged on the shaft $d$ in the box-like structure, having a pivoted top plate $b$, combined with the separable retaining device for the shaft, consisting of the recessed flange $i'$, slide $i^2$ therein, and pivoted segment $i^4$, normally resting on the top of said slide, substantially as described.

3. The grating-cylinder and pins 2, carried by it, the inclined plate $e$, partially perforated, arranged below the grating-cylinder, and retractive springs attached thereto and having the ear 3 in the path of movement of said pins, to be acted on thereby, and the two compartments $f f'$, substantially as described.

4. The grating-cylinder arranged in a box-like structure having a pivoted top plate, the movable plate $e$, partially perforated, and receptacles $f f'$, arranged to slide under said plate, combined with the adjusting device for the top plate, consisting of the slotted plate $o$ and set-screw $o^2$, substantially as described.

5. The top plate, the opening therein, the grating-cylinder having an opening through it to register with the opening in the top plate, combined with a knife $n$, inclosed in said cylinder, a crank by which the knife is borne carried by the cylinder, and a rotatable shaft or stud for the crank, substantially as described.

6. The top plate, the opening therein, the grating-cylinder having an opening to register with the opening in the top plate, combined with a knife $n$, having a pin $n^7$, the crank $n^2$, shaft $n^3$, and rod $d^3$, wherewith said pin co-operates, all located in said cylinder, substantially as and for the purposes specified.

7. In an organized machine for cutting, slicing, and grating cheese, &c., the top plate having an opening therein, and an extended portion, the circular saw and guide carried by said extended portion, the grating-cylinder, a shaft upon which said saw and cylinder are mounted, and the movable slicing-knife carried by the cylinder, all substantially as and for the purposes set forth.

8. In an organized machine for cutting or slicing and grating cheese, &c., the top plate having the opening $m^2$ therein, the grating-cylinder and shaft carrying it, and a cutting device consisting of a circular disk secured by a set-screw $m'$ on said shaft projecting through said opening in the top plate, and protruding knife-edges on the face of said disk for slicing or shaving material held against said face, substantially as and for the purposes set forth.

In testimony whereof we have signed our names to this specification in the presence of two subscribing witnesses.

JOSEPH VERCELLI.
BATTISTA GRAZIANA.

Witnesses:
BERNICE J. NOYES,
ANNIE S. WIEGAND.